United States Patent
Fries et al.

(10) Patent No.: US 11,618,449 B2
(45) Date of Patent: Apr. 4, 2023

(54) METHOD AND A CONTROL UNIT FOR STOPPING A VEHICLE WHEN STOPPING AT DIFFERENT TYPES OF STOP POSITIONS

(71) Applicant: VOLVO TRUCK CORPORATION, Gothenburg (SE)

(72) Inventors: Johan Fries, Gråbo (SE); Teodoro Bora, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 75 days.

(21) Appl. No.: 17/425,196

(22) PCT Filed: Jan. 30, 2019

(86) PCT No.: PCT/EP2019/052192
§ 371 (c)(1),
(2) Date: Jul. 22, 2021

(87) PCT Pub. No.: WO2020/156649
PCT Pub. Date: Aug. 6, 2020

(65) Prior Publication Data
US 2022/0089159 A1  Mar. 24, 2022

(51) Int. Cl.
*B60W 10/18* (2012.01)
*B60W 30/18* (2012.01)
(Continued)

(52) U.S. Cl.
CPC .......... *B60W 30/181* (2013.01); *B60W 10/18* (2013.01); *B60W 30/18109* (2013.01);
(Continued)

(58) Field of Classification Search
CPC ............... B60W 30/181; B60W 10/18; B60W 30/18109; B60W 40/02; B60W 60/001;
(Continued)

(56) References Cited

U.S. PATENT DOCUMENTS

2008/0077283 A1* 3/2008 Ueyama ........... G08G 1/096827
701/1
2016/0144861 A1* 5/2016 Cao ..................... B60W 30/181
701/22
(Continued)

FOREIGN PATENT DOCUMENTS

EP          1906376 A2     4/2008
JP       2008080896 A      4/2008
(Continued)

OTHER PUBLICATIONS

Japan Office Action dated Oct. 4, 2022 in corresponding Japan Patent Application No. 2021-542201, 6 pages.
(Continued)

*Primary Examiner* — Peter D Nolan
*Assistant Examiner* — Ashley L Redhead, Jr.
(74) *Attorney, Agent, or Firm* — Venable LLP; Jeffri A. Kaminski

(57) ABSTRACT

The invention relates to a method for a control unit (10) for stopping a vehicle (1) when stopping at different types of stop positions (2, 3, 4), the method comprising the following steps: —(S1) the control unit receiving input about a specific stop position for the vehicle, associated with when the vehicle is about to stop during a stopping sequence, the input being indicative of whether the specific stop position requires a high-precision stop or if a stop with a lower precision can be used; and —(S2) when the stop position requires a high-precision stop, the control unit controlling the stopping sequence such that the vehicle stops with a first stopping precision level with respect to the specific stop position, and when a lower precision can be used for the stop, the control unit controlling the stopping sequence such that the vehicle stops with a second stopping precision level which is lower than the first precision level. The invention
(Continued)

further relates to a control unit and to a vehicle comprising the control unit.

13 Claims, 2 Drawing Sheets

(51) Int. Cl.
*B60W 60/00* (2020.01)
*B60W 40/02* (2006.01)

(52) U.S. Cl.
CPC .......... *B60W 40/02* (2013.01); *B60W 60/001* (2020.02); *B60W 2300/10* (2013.01); *B60W 2300/12* (2013.01); *B60W 2300/17* (2013.01); *B60W 2556/50* (2020.02); *B60W 2556/60* (2020.02)

(58) Field of Classification Search
CPC ......... B60W 2300/10; B60W 2300/12; B60W 2300/17; B60W 2556/50; B60W 2556/60; B60W 2050/0075; B60W 2555/60; B60W 2556/45; B60W 30/186; B60W 30/17; B60W 30/18154; B60W 2420/42; B60W 2420/52; B60W 2520/04; B60W 30/18018; B60Y 2300/18158; B60Y 2200/14; B60Y 2200/41; B60T 2210/36
See application file for complete search history.

(56) References Cited

U.S. PATENT DOCUMENTS

| | | |
|---|---|---|
| 2016/0257309 A1* | 9/2016 | Kumar .............. B60W 50/0097 |
| 2016/0297431 A1* | 10/2016 | Eigel ..................... B60W 30/06 |
| 2016/0318490 A1* | 11/2016 | Ben Shalom ... B60W 30/18154 |
| 2018/0141547 A1* | 5/2018 | Fujiki .................. B60W 30/10 |
| 2018/0345969 A1 | 12/2018 | Yasui et al. |
| 2020/0201319 A1* | 6/2020 | Gross ...................... H04W 4/44 |
| 2022/0089159 A1* | 3/2022 | Fries ..................... B60W 10/18 |

FOREIGN PATENT DOCUMENTS

| | | |
|---|---|---|
| JP | 2016002957 A | 1/2016 |
| JP | 2016203974 A | 12/2016 |
| JP | 2017090968 A | 5/2017 |
| JP | 2018203016 A | 12/2018 |

OTHER PUBLICATIONS

International Search Report and Written Opinion dated Oct. 28, 2019 in corresponding International PCT Application No. PCT/EP2019/052192, 8 pages.

\* cited by examiner

METHOD AND A CONTROL UNIT FOR STOPPING A VEHICLE WHEN STOPPING AT DIFFERENT TYPES OF STOP POSITIONS

CROSS-REFERENCE TO RELATED APPLICATIONS

This application is a U.S. National Stage application of PCT/EP2019/052192, filed Jan. 30, 2019, and published on Aug. 6, 2020, as WO 2020/156649 A1, all of which is hereby incorporated by reference in its entirety.

TECHNICAL FIELD

The invention relates to method for a control unit for stopping a vehicle when stopping at different types of stop positions. The invention furthermore relates to a control unit, to a vehicle comprising the control unit, to a computer program and/or to a computer readable medium.

The invention can be applied in heavy-duty vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

Autonomous driving of vehicles in public and in closed traffic networks is an area which is likely to increase in importance in the coming years. This includes commercial vehicles, such as trucks and buses.

During autonomous driving, which may be ongoing for a certain period of time and/or during a certain type of driving situation or even for the complete driving cycle of the vehicle, the autonomous vehicle is generally experiencing a number of different situations, such as starting, turning, accelerating, braking and stopping sequences. These situations are normally handled by a control unit of the vehicle, which may be a so called vehicle motion management (VMM) unit, which controls e.g. propulsion, braking and steering. The control unit may drive the vehicle such that it follows an intended road path without deviating from the road path. The control is generally performed by receiving input from sensors on the vehicle which identifies the road and which also may identify external objects. As an example, the sensors may be LIDAR and/or RADAR sensors. As is well known, a LIDAR sensor uses laser to measure distance to an object, whereby RADAR uses radio waves to measure distance to an object.

When a control unit determines that the vehicle shall stop with respect to a stop position, the control unit controls the vehicle such that it stops at or nearby the stop position. To stop the vehicle, the control unit controls propulsion and/or braking, and possibly even steering, such that the vehicle stops with respect to the stop position.

SUMMARY

In view of the above, an object of the invention is to provide a method, a control unit and/or a vehicle, which improves how a vehicle stops with respect to a stop position. According to a first aspect, the object is achieved by a method according to claim 1. According to a second aspect, the object is achieved by a control unit according to claim 8. According to a third aspect, the object is achieved by a vehicle according to claim 9. According to a fourth aspect, the object is achieved by a computer program according to claim 12, According to a fifth aspect, the object is achieved by a computer readable medium carrying a computer program according to claim 13. Further advantages and advantageous features of the invention are disclosed in the following description and in the dependent claims.

According to the first aspect thereof, the object is achieved by a method for a control unit for stopping a vehicle when stopping at different types of stop positions, the method comprising the following steps:

the control unit receiving input about a specific stop position for the vehicle, associated with when the vehicle is about to stop during a stopping sequence, the input being indicative of whether the specific stop position requires a high-precision stop or if a stop with a lower precision can be used; and when the stop position requires a high-precision stop, the control unit controlling the stopping sequence such that the vehicle stops with a first stopping precision level with respect to the specific stop position, and when a lower precision can be used for the stop, the control unit controlling the stopping sequence such that the vehicle stops with a second stopping precision level which is lower than the first precision level.

By the provision of the method as disclosed herein, a vehicle may be automatically stopped with respect to different types of stop positions with respective different precision levels, relating to either high-precision stops or low-precision stops. It has namely been realized that by applying different precision levels, and when possible, applying lower precision levels, wear of certain components in the vehicle may be reduced. For example, if stopping with a high precision level, wear of brakes, clutches etc. of the vehicle may increase. Wear is generally a larger issue for heavier vehicles, such as heavy-duty trucks, buses and/or construction equipment vehicles. Therefore, in view of the above, the present invention is based on the realization that by reducing the number of high-precision stops when automatically stopping a vehicle, the service life of certain components in the vehicle may be increased. In addition, the present invention may improve the efficiency of the autonomous driving in that the time for stopping the vehicle may be reduced if a lower precision level is used.

Optionally, whether a high-precision stop is required or if a stop with a lower precision can be used may be determined by mapping the specific stop position with one of two or more predetermined stop positions from a list of pre-known stop positions, wherein each one of the predetermined stop positions relates to a high precision stop or to a stop where a lower precision can be used. Still optionally, each one of the two or more predetermined stop positions is anyone of the following: a traffic light, a road intersection, another vehicle, a fixed object, such as a loading dock or a garage, a specific area, such as a parking lot for the vehicle.

Optionally, the first and/or second precision level may be set such that the precision level may not overlap/intersect the specific stop position. Still optionally, the first and/or second precision level may be set such that it allows for an overlap/intersection of the specific stop position for predetermined types of stop positions and does not allow for an overlap/intersection of the specific stop position for other predetermined types of stop positions. For example, in the case the stop position is a parking space, it may be allowed to overlap the stop position by a maximum predetermined level. This may result in increased flexibility, and also it may improve safety in situations where it is important to not overlap the stop position, such as when stopping in front of a garage or loading bay.

Optionally, the received input may comprise information from a sensor on the vehicle which identifies the specific stop position and/or the received input may comprise information from an auxiliary unit, such as a traffic situation manager or site control. A traffic situation manager may be defined as a remote control unit which analyses the traffic situation around the vehicle and provides information to the vehicle relating to how the vehicle shall be controlled with respect to the traffic situation. A site control may be defined as a control unit for a specific site, such as a confined area, and which provides information and/or control instructions to the vehicles within the confined area. The confined area may be a harbour area, a construction area, a logistics area or the like. Still optionally, the sensor on the vehicle may be any one of the following: a camera, a LIDAR and a RADAR.

Optionally, the received input may comprise geographical position information of the vehicle, such as information from a global navigation satellite system (GNSS), and/or vehicle route information. As an example, the geographical position information and/or the vehicle route information may be associated to different types of stop positions. Thereby, by receiving this information, it may be determined which type of stop position the vehicle is approaching, and by use of this information the vehicle may stop with either high or low precision.

Optionally, the first and/or second precision level may comprise at least one compensating parameter, which at least one compensating parameter is compensating for at least one of the following: a weather condition, a road condition, time and/or date and a characteristic of the vehicle. For example, a weather condition may require a higher precision level than normal. A road condition, such as if it is slippery due to ice/snow, may also require adjusting the precision level. A characteristic of the vehicle, such as if the vehicle is heavily loaded, may also require adjusting the precision level. Therefore, by also adding a correction parameter based on the above, the stopping sequence may be improved, increasing the likelihood that the vehicle will stop at the stop position as expected.

According to the second aspect thereof, the object is achieved by a control unit for a vehicle, preferably an autonomous vehicle, configured to perform the steps of the method of any one of the embodiments of the first aspect of the invention. The advantages of the second aspect are analogous to the advantages of the first aspect of the invention. It shall also be noted that all embodiments of the second aspect of the invention are applicable to all embodiments of the first aspect of the invention and vice versa.

According to the third aspect thereof, the object is achieved by a vehicle comprising the control unit according to any one of the embodiments of the second aspect of the invention. The advantages of the third aspect are analogous to the advantages of the first and second aspects of the invention. It shall also be noted that all embodiments of the third aspect of the invention are applicable to all embodiments of the first and second aspects of the invention and vice versa. Preferably, the vehicle is an autonomous vehicle. An autonomous vehicle is defined as a vehicle in which autonomous control without human involvement, comprising propulsion, braking and possibly steering, is performed for at least a limited time period during driving of the vehicle. Optionally, the autonomous vehicle is a fully autonomous vehicle where propulsion, braking and steering is performed for at least a limited time period, or for the complete driving cycle of the vehicle.

Optionally, the vehicle may be a commercial vehicle, such as a truck, a construction equipment vehicle or a bus.

According to the fourth aspect thereof, the object is achieved by a computer program comprising program code means for performing the steps of any of the embodiment of the first aspect of the invention, when said program is run on a computer.

According to the fifth aspect thereof, the object is achieved by a computer readable medium carrying a computer program comprising program code means for performing the steps of any of the embodiments of the first aspect of the invention, when said program product is run on a computer.

BRIEF DESCRIPTION OF THE DRAWINGS

With reference to the appended drawings, below follows a more detailed description of embodiments of the invention cited as examples.

In the drawings.

Figure 1:
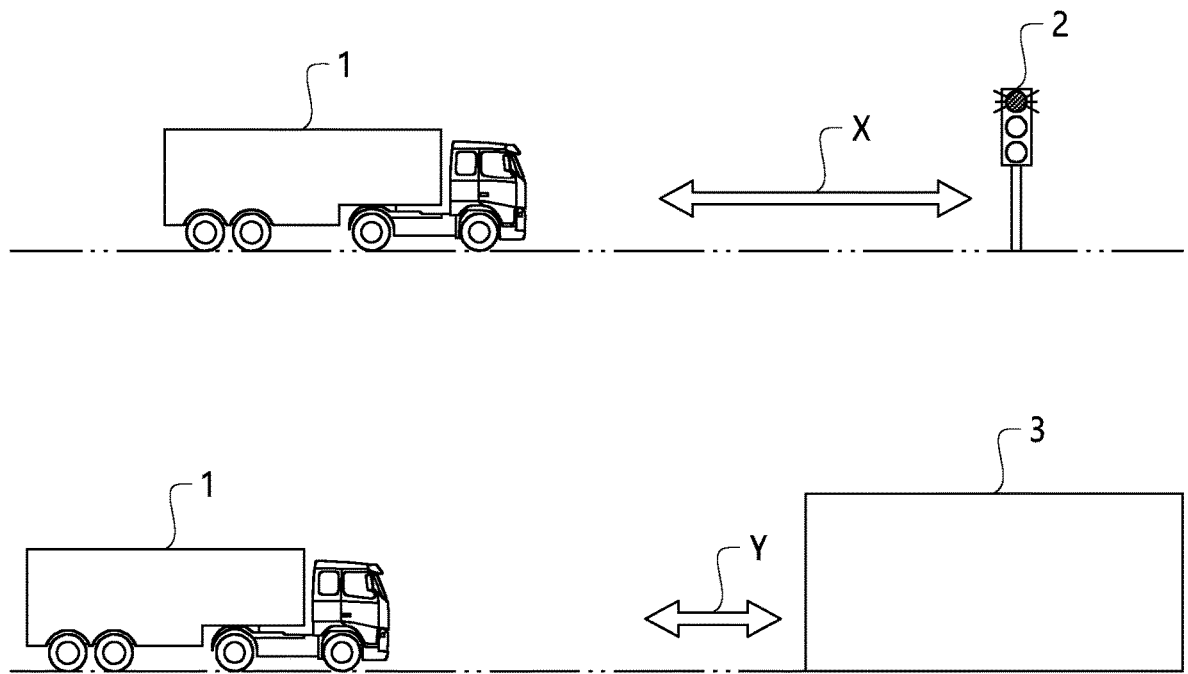
FIG. 1 shows an autonomous truck which is about to stop with respect to two different types of stopping positions according to example embodiments of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 2:
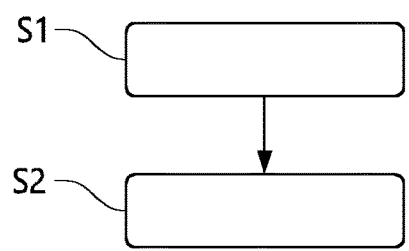
FIG. 2 shows a flowchart of a method according to an example embodiment of the present invention.

With respect to FIGS. 1 and 2, example embodiments of a method and a vehicle according to the invention will be described. FIG. 1 shows when an autonomous truck 1 is about to stop with respect to either a traffic light 2 or a garage 3. In this example, the vehicle is a heavy-duty truck. However, the invention is not limited to only this type of vehicle, but also other vehicles, such as buses, construction equipment etc. may advantageously make use of the present invention. The invention is particularly suitable for larger and heavier vehicles, since these vehicles are more prone to wear during stopping sequences.

The autonomous truck 1 comprises a control unit (not shown) which is configured to perform the step S1 of receiving input about a specific stop position for the truck 1, associated with when the truck is about to stop during a stopping sequence. The stop position is here either the traffic light 2 or the garage 3. The input is further indicative of whether the specific stop position, 2 or 3, requires a high-precision stop or if a stop with a lower precision can be used. In the case the stop position is the traffic light 2, a lower precision level can likely be used compared to if the stop position is the garage 3. Hence, a lower precision level can be used for the traffic light 2 and a higher precision level can be used for the garage 3. For example, the required precision level for the specific stop position may be set in meters, centimetres or millimetres. The received input about the stop position may for example comprise information about the type of stop position, e.g. whether it is a traffic light or a garage. Additionally, or alternatively, the received input may comprise information such as if the stop should be a high-precision stop or a low-precision stop. Still additionally, or alternatively, the received input may comprise information about the required precision level for the stop, such as if the stop requires a precision of 1-2 metres (low-precision) or if the stop requires a precision of 5-10 centimetres (high-precision). Still additionally, or alternatively, the received input may comprise information about the geographical position and/or the vehicle route of the truck 1, whereby this information may be used for identifying which type of stop position the truck 1 is approaching when in use.

Based on the input, the control unit is configured to perform a second step S2 according to the following: when the stop position requires a high-precision stop, e.g. the garage 3, the control unit controls the stopping sequence such that the autonomous truck 1 stops with a first stopping precision level Y with respect to the specific stop position, and when a lower precision can be used for the stop, e.g. the traffic light 2, the control unit controls the stopping sequence such that the autonomous truck 1 stops with a second stopping precision level X which is lower than the first precision level. Depending on the current conditions during the stopping sequence, the precision level may be adjusted by a correction parameter. The current condition may for example be a bad weather condition, if the road is slippery or not, if the truck is heavily loaded or not, or the like.

By the provision of the present invention, the autonomous truck 1 can stop with a lower precision level when possible, thereby reducing unnecessary wear of components in the truck, such as brakes, clutches etc. (not shown).

Figure 3:
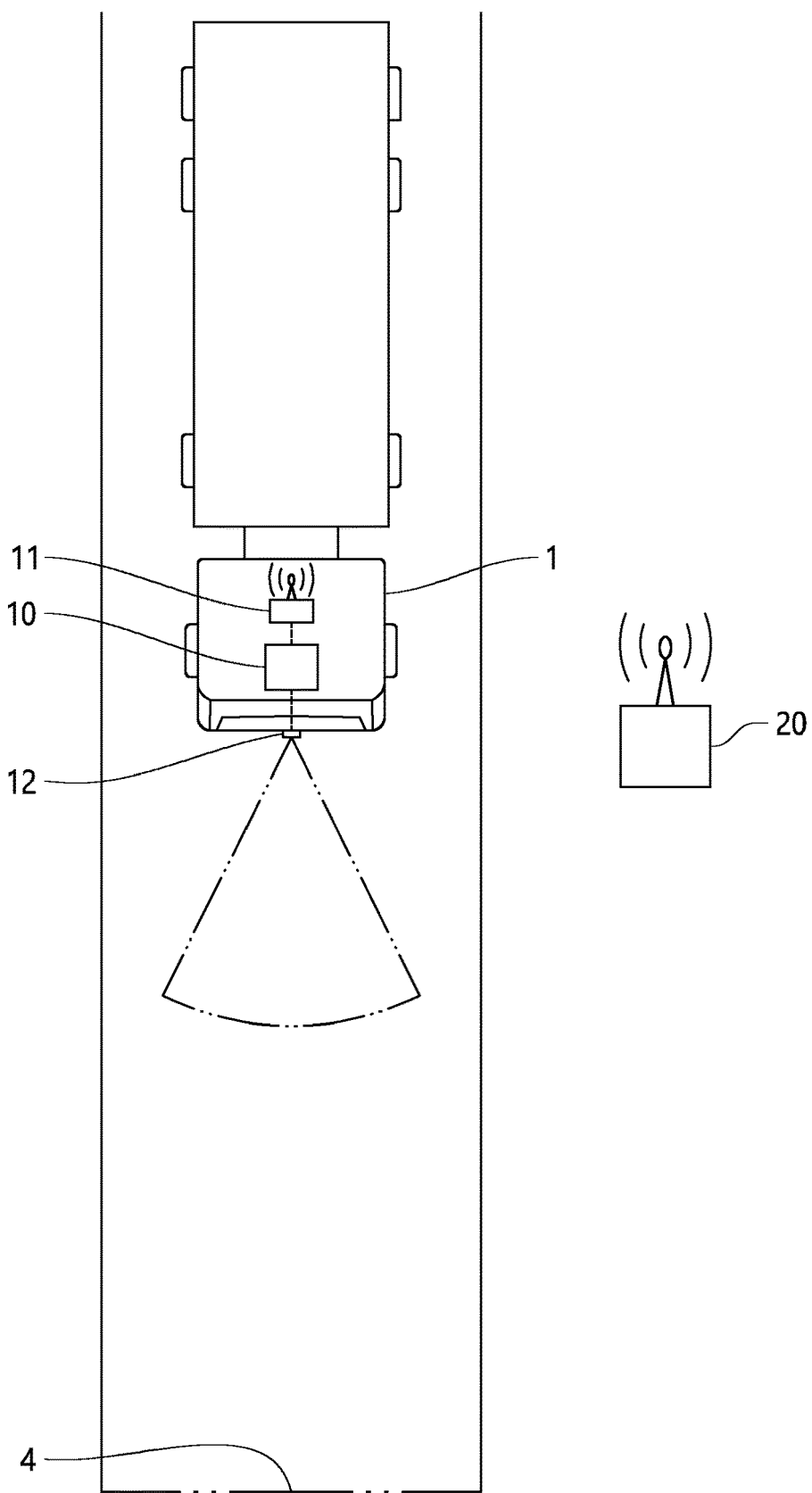
FIG. 3 shows a truck from above which is about to stop with respect to a stop position according to example embodiments of the present invention.

FIG. 3 shows a schematic view of an autonomous truck 1 seen from above according to example embodiments of the present invention. The truck 1 is driving autonomously along a road section and is about to stop at a stop position 4, which in this example is a road intersection. The truck 1 comprises a control unit 10. The control unit 10 may be communicatively connected to a sensor 12, which in this example is a LIDAR sensor mounted at the front of the truck 1. It shall be understood that the present invention is not limited to this type of sensor and that any type of sensors may be used which is able to identify a stop position. The control unit 12 may also be connected to a communication unit 11, which in this example is a wireless communication unit configured for receiving and/or transmitting information from an auxiliary unit 20. The auxiliary unit 20 is in this example embodiment a remotely located control unit which is configured for wireless transmission of traffic related information to the truck 1, which information is received by the communication unit 11. Just as a matter of example, the wireless transmission may be performed by 3g, 4g, 5g, Wi-Fi or any other suitable transmission technique.

For example, the control unit 20 may wirelessly transmit information about the stop position 4 to the truck 1, which information is indicative of whether the road intersection 4 requires a high-precision stop or if a stop with a lower precision level can be used. The transmitted information may for example comprise information about the precise precision level needed. Alternatively, or additionally, the transmitted information may comprise information about the type of stop position. For example, the transmitted information may only be indicative of that the stop position is a road intersection 4. The control unit 10 may use this information and compare it with a list of predetermined stop positions. Each predetermined stop position may be associated with a specific precision level. Hence, the control unit 10 may receive input indicating that the stop is a road intersection, map the received input to one of the predetermined stop positions corresponding to the road intersection, and then control the truck 1 such that it stops with the precision level associated to the predetermined stop position. As an alternative, or additionally, the sensor 12 may be used for identifying the type of stop position. It shall be noted that the control unit 10 is preferably integrated into the truck 1. However, the control unit 10 controlling the stopping sequence may alternatively be located remotely from the truck 1, and then transmit signals to the truck 1, which signals are used for controlling at least one of braking and propulsion of the truck 1. For example, the control unit 10 may be a part of the auxiliary unit 20. Any one of the control units 10 and 20 may preferably comprise a processing unit and optionally also a memory unit. A control unit may be defined as an electronic device which is configured for performing a sequence of steps, preferably via a computer program.

It is to be understood that the present invention is not limited to the embodiments described above and illustrated in the drawings; rather, the skilled person will recognize that many changes and modifications may be made within the scope of the appended claims.

The invention claimed is:

1. A method for a control unit for stopping a vehicle when stopping at different types of stop positions, the method comprising the following steps:
   the control unit receiving input about a specific stop position for the vehicle, associated with when the vehicle is about to stop during a stopping sequence, the input being indicative of whether the specific stop position requires a high-precision stop or if a stop with a lower precision can be used; and
   when the stop position requires a high-precision stop, the control unit controlling the stopping sequence such that the vehicle stops with a first stopping precision level with respect to the specific stop position, and when a lower precision can be used for the stop, the control unit controlling the stopping sequence such that the vehicle stops with a second stopping precision level which is lower than the first precision level.

2. The method according to claim 1, wherein whether a high-precision stop is required or if a stop with a lower precision can be used is determined by mapping the specific stop position with one of two or more predetermined stop positions from a list of pre-known stop positions, wherein each one of the predetermined stop positions relates to a high precision stop or to a stop where a lower precision can be used.

3. The method according to claim 2, wherein each one of the two or more predetermined stop positions is anyone of the following: a traffic light, a road intersection, another vehicle, a fixed object, such as a loading dock or a garage, a specific area, such as a parking lot for the vehicle.

4. The method according to claim 1, wherein the received input comprises information from a sensor on the vehicle which identifies the specific stop position and/or the received input comprises information from an auxiliary unit, such as a traffic situation manager or site control.

5. The method according to claim 4, wherein the sensor is any one of the following: a camera, a LIDAR and a RADAR.

6. The method according to claim 1, wherein the received input comprises geographical position information of the vehicle, such as information from a global navigation satellite system, and/or vehicle route information.

7. The method according to claim 1, wherein the first and/or second precision level comprises at least one compensating parameter, which at least one compensating parameter is compensating for at least one of the following: a weather condition, a road condition, time and/or date and a characteristics of the vehicle.

8. A control unit for a vehicle, preferably an autonomous vehicle, configured to perform the steps of the method of claim 1.

9. A vehicle comprising the control unit according to claim 8.

10. The vehicle according to claim 9, wherein the vehicle is an autonomous vehicle.

11. The vehicle according to claim 9, wherein the vehicle is a commercial vehicle, such as a truck, a construction equipment vehicle or a bus.

12. A computer program comprising program code means for performing the steps of claim 1, when said program is run on a computer.

13. A computer readable medium carrying a computer program comprising program code means for performing the steps of claim 1, when said program product is run on a computer.

* * * * *